(12) United States Patent
Cervantez et al.

(10) Patent No.: US 10,979,461 B1
(45) Date of Patent: Apr. 13, 2021

(54) AUTOMATED DATA SECURITY EVALUATION AND ADJUSTMENT

(71) Applicant: Amazon Technologies, Inc., Seattle, WA (US)

(72) Inventors: Michael Jerry Cervantez, Fairfax, VA (US); Sheila Mary Soulia, Ashburn, VA (US); Russell Richard Leighton, Cabin John, MD (US); Matthew R. Evans, Arlington, VA (US)

(73) Assignee: Amazon Technologies, Inc., Seattle, WA (US)

( * ) Notice: Subject to any disclaimer, the term of this patent is extended or adjusted under 35 U.S.C. 154(b) by 320 days.

(21) Appl. No.: 15/909,760

(22) Filed: Mar. 1, 2018

(51) Int. Cl.
  *G06F 21/62* (2013.01)
  *H04L 29/06* (2006.01)
  *G06N 20/00* (2019.01)

(52) U.S. Cl.
  CPC ........ *H04L 63/205* (2013.01); *G06F 21/6245* (2013.01); *G06N 20/00* (2019.01); *H04L 63/105* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 8,984,583 B2 * | 3/2015 | Bhatti | ...................... | G06F 21/62 726/1 |
| 2008/0208917 A1 * | 8/2008 | Smoot | ...................... | G06F 16/10 |
| 2012/0303558 A1 * | 11/2012 | Jaiswal | .................. | G06N 20/00 706/12 |
| 2014/0325640 A1 * | 10/2014 | Aggarwal | ............... | G06F 21/31 726/18 |
| 2015/0242486 A1 * | 8/2015 | Chari | ..................... | H04L 67/306 707/737 |
| 2015/0254469 A1 * | 9/2015 | Butler | ................. | G06F 21/6218 706/12 |
| 2016/0350148 A1 * | 12/2016 | Kitagawa | ............ | G06F 9/45504 |
| 2016/0352759 A1 * | 12/2016 | Zhai | ........................ | G06N 20/00 |
| 2017/0353477 A1 * | 12/2017 | Faigon | ................... | G06N 7/005 |
| 2018/0082073 A1 * | 3/2018 | Trachy | ................ | G06F 11/1461 |
| 2018/0314555 A1 * | 11/2018 | Auvenshine | .......... | G06F 9/5005 |
| 2019/0164070 A1 * | 5/2019 | Gupta | ....................... | G06F 9/46 |

* cited by examiner

*Primary Examiner* — Trang T Doan
(74) *Attorney, Agent, or Firm* — Lee & Hayes, P.C.

(57) ABSTRACT

Data security may be automatically evaluated and adjusted using machine learning and/or satisfiability modulo theories (SMT). In various examples, a machine learning model(s) may be trained using training data that includes samples of customer data labeled with different types of data corresponding to different sensitivity levels of the samples of the customer data. Once trained, this trained machine learning model(s) can be used to classify data that is, or is requested to be, stored in a storage container. A SMT solver(s) may then evaluate the sufficiency of the existing data security (e.g., an existing access policy) of the storage container. Based on the result of the SMT solver's data security evaluation, an action(s) may be taken, such as a remedial action (e.g., adjusting data security of the storage container), a notification action (e.g., sending an alert about the data security deficiency), or the like.

20 Claims, 10 Drawing Sheets

AUTOMATED DATA SECURITY EVALUATION AND ADJUSTMENT

BACKGROUND

Network-based storage services store data on behalf of customers so that the customers can later access their data on-demand. In order to prevent unauthorized access to the data, an access policy can be applied to a storage container that contains the data and/or to an individual data object within the storage container. Due to the complexity of these access policies, customers often mistakenly apply overly-permissive policies to their storage containers. This is primarily due to the manner in which access policies are defined. In many cases, Identity and Access Management (IAM)-based access controls are used to define an access policy, and such an access policy can include a high number of nested conditions or criteria (e.g., nested "ANDS" and "ORs") that are traversed in real-time in order to determine whether a user attempting to access particular data should be granted access or not. The average customer may find it difficult to understand these types of access policies due to their complexity. This is a concern when highly sensitive data is at stake.

For example, a hospital that is using a network-based storage service to store highly sensitive medical data pertaining to its patients may intend to apply a highly secure access policy to a storage container that stores the medical data, but may mistakenly apply an overly-permissive access policy to the storage container, thereby putting the medical data at risk of unintentional disclosure and/or theft. In some cases, a customer of the network-based storage service may inadvertently store highly sensitive data in a storage container with an overly-permissive access policy, such as one that is open to the general public or to a wide audience of people that should not have access to the highly sensitive data. Moreover, malicious actors may attempt to steal sensitive data, such as personally identifiable information (PII), through hacking and other illicit means. For instance, a malicious actor may attempt to enumerate storage containers with overly-permissive access policies in order to access PII and other sensitive data. These data security issues can result in sensitive data ending up in the wrong hands.

The disclosure made herein is presented with respect to these and other considerations.

DETAILED DESCRIPTION

Figure 1:
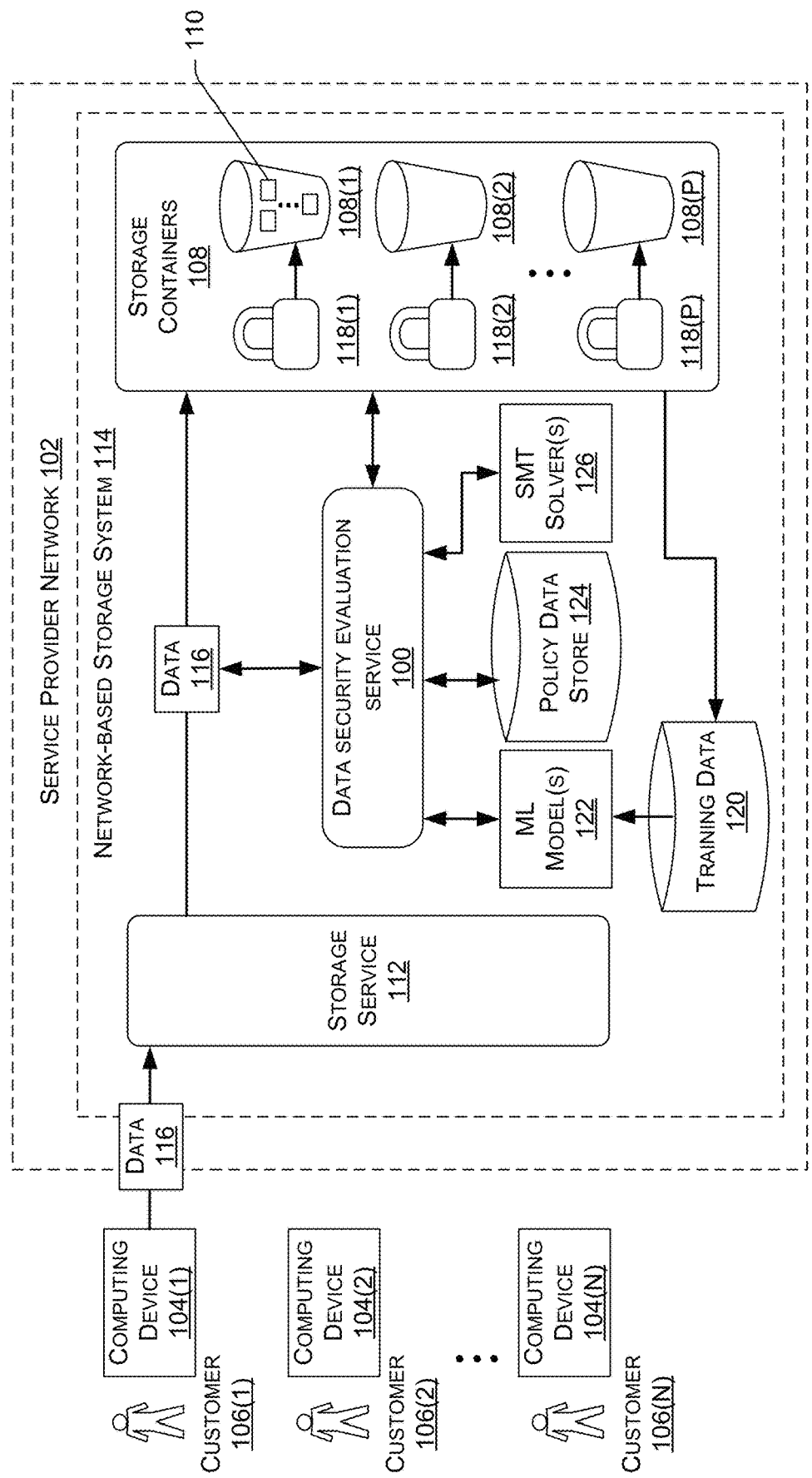
FIG. 1 is a software and network architecture diagram showing aspects of the operation of a data security evaluation service of a network-based storage system, according to some configurations.

Described herein are, among other things, techniques, devices, and systems for automated evaluation and adjustment of data security for data that is maintained by a network-based storage system. In particular, customers of a network-based storage service can store data in storage containers maintained by a network-based storage system. This customer data can be of varying levels of sensitivity. For example, a hospital may store highly sensitive medical data using the network-based storage service, another customer may store sensitive PII for a list of employees or clients using the network-based storage service, while another customer may store data that is not sensitive, such as non-PII data, publicly available data, or the like.

It is to be appreciated that, over time, the amount of customer data maintained by such a network-based storage system can become quite large as the number of customers increases, and as these customers store increasing amounts of data using the network-based storage service. With the availability of this vast collection of customer data, a machine learning model(s) can be trained on the data to learn how to classify unknown data as a type of data among different types of data that correspond to different levels of sensitivity. For example, the machine learning model(s) may be trained using training data that includes samples of customer data labeled with different types of data corresponding to different sensitivity levels of the samples of the customer data. Once trained, this trained machine learning model(s) can be used to classify data that is, or is requested to be, stored in a storage container. A satisfiability modulo theories (SMT) solver(s) may then evaluate the sufficiency of the existing data security (e.g., an existing access policy) of the storage container. Based on the result of the SMT solver's data security evaluation, an action(s) may be taken. For example, if the SMT solver determines that an existing access policy of the storage container is less secure than a sufficient access policy that is adequate for the sensitivity level of the type of data that is, or is requested to be, stored in the storage container, one or more actions can be performed, such as an action to automatically remedy the identified data security deficiency (e.g., by adjusting the access policy to an appropriate data security level), or an action to alert a user (e.g., the customer) that the existing access policy associated with the storage container is insufficient for protecting the type of data.

Implementations of the techniques and systems described herein can improve existing technologies (e.g., data security technologies), and can improve the functioning of the systems with respect to conventional systems. In particular, the implementations described herein allow a network-based storage system to provide improved data security for customer data maintained on behalf of customers, as compared to conventional storage services, which may allow customers to apply overly-permissive access policies to storage containers that contain sensitive data. This provides a better-performing network-based storage system that mitigates the adverse impacts noted above, such as unintentional data disclosure and/or theft of highly sensitive data. Resources, such as processing resources, may also be conserved by, for example, selectively evaluating existing data security for types of data that meet or exceed a sensitivity threshold, and thereby refraining from evaluating data security sufficiency in cases where it doesn't make sense to do so (e.g., in cases where the customer data is not at or above a sensitivity threshold to warrant a data security evaluation). These techniques will be described in more detail below. Customer experience is also improved by the techniques and systems described herein by improving the security of customer data, which gives customers of a network-based storage service piece-of-mind that their sensitive data is unlikely to end up in the wrong hands.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein can be practiced in distributed computing environments, such as a service provider network, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a software and network architecture diagram showing aspects of the operation of a data security evaluation service 100, according to some configurations. A service provider network 102 may represent a computing network configured to provide computing resources (which might be referred to simply as "resources") on a permanent or an as-needed basis. Among other types of functionality, the computing resources provided by the service provider network 102 can be utilized to implement various types of network services. The computing resources provided by the service provider network 102 can include data processing resources, data storage resources, virtual machine ("VM") instances, networking resources, data communication resources, network services, and other types of computing resources.

The service provider network 102 can be accessed using an appropriate computing system, such as computing devices 104(1), 104(2), . . . , 104(N) (collectively 104), to communicate with the service provider network 102 over an appropriate data communications network. In this way, customers 106(1), 106(2), . . . , 106(N) (collectively 106) of the service provider network 102 can configure various aspects of the operation of the computing resources provided by the service provider network 102, or to otherwise control any computing resources being utilized by the customers 106.

For example, and without limitation, a computing device 104(1) can be utilized by customer 106(1) to purchase, and/or otherwise access, computing resources in the form of storage containers 108 or data objects 110 contained within the storage containers 108. The customer 106(1), using the computing device 104(1), may configure aspects of the operation of these computing resources, may access and utilize functionality provided by the various services, tools, environments, and systems described herein, and/or perform other types of functionality with regard to the operation of these and other computing resources provided by the service provider network 102.

The computing devices utilized to configure and monitor the resources in the service provider network 102 (e.g. the computing devices 104) can be any type of computing device capable of connecting to the service provider network 102 via a suitable data communications network such as, but not limited to, a laptop or desktop computer, a tablet computing device, a server computer, or a smartphone.

Administrative users employed by the owner or operator of the service provider network 102, such as administrators managing the operation of the service provider network 102, can also connect with, manage, and utilize resources provided by network services executing within the service provider network 102 in a similar fashion. Additional details regarding the configuration and operation of the service provider network 102 will be provided below with regard to FIGS. 7-10.

As discussed briefly above, the service provider network 102 can be configured to execute various types of network services. For example, and without limitation, the service provider network 102 can implement a storage service 112, which may be part of a network-based storage system 114. The storage service 112 can be a network-based storage service that stores and maintains data on behalf of customers 106 of the service provider network 102. The data stored by the storage service 112 can be received from computing devices 104 of customers 106 of the storage service 108 or from another source (e.g., a data streaming source) associated with one or more of the customers 106. For example, the storage service 112 (and hence, the network-based storage system 114) may receive data 116 from a computing device 104(1) of a customer 106(1) as part of a request to store the data 116 in a storage container 108(1) that is associated with the customer 106(1), and which is maintained by the network-based storage system 114.

That is, the network-based storage system 114 may provide and maintain logical storage units in the form of storage containers 108 (sometimes referred to as "buckets") that are accessible to authorized computing devices 104 and/or authorized customers 106, and/or to VM instances provided by an on-demand computing service executing in the service provider network 102, and/or to other authorized computing devices. The storage containers 108(1), 108(2), ..., 108(P) (collectively 108) may be of any number. An individual customer 106 may be associated with a single storage container 108 or a plurality of storage containers 108. In some configurations, the storage containers 108 may be created, and maintained, within one of various geographical regions, and may contain data objects 110 that include data, such as the data 116. In some cases, the data 116 may be received by the storage service 112 in the form of a data object 110 that includes the data 116 and possibly additional data or information. For example, a data object 110 may include additional information and/or data besides the data 116 itself, such as a name (or key) of the data object 110, a version identifier (ID) of the data object 110, metadata (e.g., a time of creation of the data object 110, a size of the data object 110, a modification history of the data object 110, file type of the data object 110, encryption information of the data object 110, etc.), subresources, and access control information (e.g., an access policy), etc. As mentioned, the storage containers 108 and data objects 110 contained therein are examples of "resources" that can be created and managed within the network-based storage system 114 on behalf of the customers 106. An individual storage container 108 may be implemented in any suitable manner, such as by using block or file-level storage devices (and/or virtualizations thereof). By maintaining customer's data 116 in the storage containers 108, remote access to the data 116 and/or other functionality is enabled for customers 106 utilizing associated computing devices 104 to remotely access the data 116.

Requests received from customers 106 (or their computing devices 104) can include read requests (e.g., a GET request), write requests (e.g., a PUT request), copy requests, migration requests, delete requests, requests for metadata of data objects (e.g., HEAD request), or any other type of request relating to storage, retrieval, or modification of data 116 and/or data objects 110 stored in storage containers 108. In some configurations, requests received from customers 106 (or their computing devices 104) can be related to at least one of accessing data 116 included in a data object 110 and maintained in storage containers 108, creating the data objects 110 and/or storage containers 108, and/or deleting the data objects 110 and/or storage containers 108.

In some configurations, the individual storage containers 108 may be identified by a prefix, which defines a location where data 116 is stored and accessed through a network-based storage service 112. A prefix can identify a storage container 108, which may be a location within a nested folder structure where data objects 110 can be stored (e.g. "container_name:/foo/bar/"). Stored data objects 110 can be accessed (e.g. read from, written to, or deleted) using the prefix and the name of the data objects 110 (e.g. "container_name:/foo/bar/object1.png"). Terms other than prefix, such as "path", might also be utilized to refer to the location at which data objects 110 can be stored by a network-based storage service 112.

The storage service 112 can control access to the storage containers 108 and/or the data objects 110 (which include data 116) using associated access policies 118. FIG. 1 shows access policies 118(1), 118(2), ..., 118(P) (collectively 118) that are associated with the storage containers 108(1)-(P). These access policies 118 may correspond to the storage containers 108 themselves such that there may be a one-to-one correspondence between an access policy 118 and the storage container 108, and the access policy 118 therefore applies to the data 116 contained within the storage container 108. Additionally, or alternatively, the access policies 118 associated with the storage containers 108 can be access policies 118 that are applied on the level of a data object 110, or a folder within the storage container 108. Thus, there may be a one-to-many correspondence between the storage containers 108 and the access policies 118, e.g., a single storage container 108 may be associated with multiple access policies 118. Individual ones of the access policies 118 can specify or define one or more of users, groups of users, or roles, as well as a set of permissions pertaining to storage container 108 access. In some configurations, these access policies 118 can be, or include, Identity and Access Management (IAM)-based access policies that enable controlled access to resources, such as storage containers 108 and/or data objects 110.

In defining an access policy 118 for a storage container 108, for example, a customer 106 may create and manage users, groups, roles, tasks, actions, etc., and use permissions to allow and/or deny those users, groups, and/or roles access (e.g., which may be defined among different levels of access) to a given storage container 108. Access policies 118 may define access levels, resources, and/or conditions that are allowed or denied for one or more services (e.g., the storage service 112). In some configurations, access policies 118 can be defined in JavaScript Object Notation (JSON) format. In some configurations, computing devices and/or users may be regarded as sources, while resources, such as storage containers 108 and/or data objects 110, may be regarded as targets, and the access policies 118 may be defined in terms of which sources are allowed or denied access to which targets using permissions, conditions, and/or other information specified in the access policies 118. Accordingly, it can be appreciated that a given access policy 118 may be fairly complex in terms of understanding a level of security—or, conversely, a level of permissiveness—provided by the given access policy 118.

As mentioned, the network-based storage system 114 (and/or the service provider network 102) may include a data security evaluation service 100. The data security evaluation service 100 (sometimes shorted herein to "service 100") may be configured to classify data (either incoming data 116, already-stored data 116, or both) as a type of data indicative of its sensitivity level. Based on this data type classification (or the sensitivity level corresponding thereto), the service 100 may identify a sufficient access policy 118 for that type of data (note that a "sufficient" access policy 118 is also referred to herein as a "corresponding" access policy 118 that corresponds (e.g., maps) to the type of data), and may evaluate an existing access policy 118 (e.g., an access policy 118 presently applied to a storage container 108 where the data 116 is, or is requested to be, stored) as compared to the sufficient access policy 118. If the evaluation indicates that the existing access policy 118 is insufficient for protecting the data 116, an action(s) may be performed, as will be described in more detail below.

As shown in FIG. 1, the data security evaluation service 100 may have access to the storage containers 108, and the data 116 stored therein, for various purposes. One of these purposes is to create training data 120 for training one or more machine learning models 122 (sometimes referred to herein as "machine learning algorithms" 122). The training data 120 may be created by labeling (or tagging) samples of customer data maintained by the network-based storage system 114 within the storage containers 108. The labels applied to the samples of customer data may indicate different types of data that correspond to different sensitivity levels of the samples of customer data. For example, a first data object 110(1) may include medical data that is highly sensitive. This first data object 110(1) (and/or the medical data included therein) may be labeled with a label such as "medical data," "highly sensitive data," or a value, code, or identifier that indicates this sensitivity level of the data in some way. In general, the different types of data with which the samples of customer data can be labeled may span a spectrum of sensitivity. For example, a second data object 110(2) may include publicly accessible data or data that does not include any PII or sensitive personal information (SPI) (sometimes referred to herein as "non-PII" data). This second data object 110(2) (and/or the non-PII or publicly accessible data included therein) may be labeled with "public data," "non-PII data," "not sensitive data," or some other value, code, or identifier that indicates this sensitivity level of the data. As another example, a third data object 110(3) may include PII or SPI. PII or SPI may include, without limitation, a name of a person, a home address, an email address, a passport number, an Internet Protocol (IP) address, a vehicle registration plate number, a driver's license number, a social security number, a credit card number, a date of birth, a birthplace, an image or data pertaining to a face, a fingerprint, or handwriting, genetic information, credentials (e.g., a username and/or password), etc. Accordingly, this third data object 110(3) (and/or the PII or SPI data included therein) may be labeled with a label such as "personal data," "sensitive data," or a value, code, or identifier that indicates this sensitivity level of the data. It can be appreciated that these example types of data can be arranged in a hierarchy, or along a spectrum or continuum, in terms of the corresponding sensitivity levels of the types of data, and that there may be any number of different sensitivity levels (e.g., sensitivity levels 1-N) specifying a lowest sensitivity level to a highest sensitivity level, as an example. Thus, the training data 120 may include a corpus of customer data samples with known sensitivity levels.

Because of legal implications of humans obtaining access and viewing sensitive data, such as PII/SPI, medical data, or data of similar sensitivity, it is to be appreciated that the training data 120 may be created in an automated fashion (i.e., without human involvement). In some configurations, unsupervised machine learning may be used on raw customer data, which may be possible due to a large corpus of customer data. In some embodiments, unsupervised machine learning may be used to create the training data 120, in which case, a machine learning model(s) 122 may create the training data 120 as a first stage of learning. In some configurations, semi-supervised learning (e.g., active learning) may be used to create the training data 120. For example, fabricated or "made-up" customer data can be labeled by humans in order to create a set of initial samples of the training data 120, and this set of initial samples can then can be processed by the machine learning model(s) 122, using semi-supervised learning, along with a larger corpus of unlabeled samples of customer data. In this semi-supervised learning scenario, the training data 120 can be augmented with more labeled samples as the machine learning model(s) 122 learn by processing unlabeled or unknown data. Furthermore, information from third party sources (e.g., sources familiar with the current state of the law in terms of data security requirements) may be used to train, and/or periodically retrain the machine learning model(s) 122.

In some configurations, heuristics and similar mechanisms may be used to infer labels for the samples of customer data in the process of create the training data 120 in an automated fashion. For instance, locality sensitive hashing can take a fabricated PII (e.g., a fabricated social security number) as input, and then label samples of customer data that match the pattern of the fabricated PII. In some configurations, hamming distance between two pieces of metadata (e.g., filenames) can be used to label samples of customer data in an automated fashion. For example, a data object 110 may include data 116 in the form of a file with a filename "tradesecrets.docx," which could be inferred to be of a particular sensitivity level based on a hamming distance function applied to the filename metadata. Other techniques, such as identification of key words/terms/phrases using natural language processing, and/or facial recognition algorithms, may be used to automatically create the labeled training data 120.

Machine learning generally involves processing a set of examples (called "training data" 120) in order to train a machine learning model(s) 122. A machine learning model 122, once trained, is a learned mechanism that can receive new data as input and estimate or predict a result as output. For example, a trained machine learning model 122 can comprise a classifier that is tasked with classifying unknown input (e.g., an unknown image) as one of multiple class labels (e.g., labeling the image as a cat or a dog). In the context of the present disclosure, the unknown input may include, inter alia, data 116 that is, or is requested to be, stored in a particular storage container 108, and the trained machine learning model(s) 122 may be tasked with classifying the unknown input (a subject for classification) as one of multiple class labels. The unknown data 116 may include text, an image(s), a video(s), multimedia, etc. Thus, the trained machine learning model(s) 122 may be configured with text recognition, image recognition, and other functionality to process unknown data 116 with various types of content. The class labels, in this case, may correspond to a classification of the unknown data 116 as a type of data among multiple different types of data corresponding to different sensitivity levels (e.g., medical data, PII or SPI data, publicly accessible data, etc.). The class labels can be directly indicative of the sensitivity, such as by including "sensitive*" in the label itself (e.g., highly sensitive data, sensitive data, moderately sensitive data, not sensitive data, etc.), or the class labels can be indirectly indicative of the sensitivity, such as by labeling the data with the actual type of data (e.g., medical data, financial data, personal data, etc.). In an illustrative example, a customer 106 may upload data 116 in the form of an image file that depicts a sensitive schematic diagram. The machine learning model(s) 122, with image recognition capabilities, may be configured to classify this data 116 as a type of data with an appropriately-high sensitivity level.

In some embodiments, the trained machine learning model(s) 122 may be configured to partition the storage containers 108 into sub-containers based on the types of data stored therein, such as after classifying the data into different types of data at varying levels of sensitivity. For example, an individual storage container 108 may include data 116 of various different types, such as a first type of data (e.g., marriage certificates), a second type of data (e.g., birth certificates), a third type of data (e.g., death certificates), and so on. The trained machine learning model(s) 122 can analyze the data 116 in this individual storage container 108 and partition the storage container 108 into sub-containers based on these types of data, such as a first sub-container that contains the first type of data (e.g., marriage certificates) and does not include the other types of data, a second sub-container that contains the second type of data (e.g., birth certificates) and does not include the other types of data, a third sub-container that contains the third type of data (e.g., death certificates) and does not include the other types of data. The machine learning model(s) 122 may then further partition the sub-containers, and/or combine sub-containers into a larger container, based on the classification (or re-classification) of the data 116 contained in those sub-containers.

The machine learning model(s) 122 may represent a single model or an ensemble of base-level machine learning models, and may be implemented as any type of machine learning model 122. For example, suitable machine learning models 122 for use with the techniques and systems described herein include, without limitation, tree-based models, support vector machines (SVMs), kernel methods, neural networks, random forests, splines (e.g., multivariate adaptive regression splines), hidden Markov model (HMMs), Kalman filters (or enhanced Kalman filters), Bayesian networks (or Bayesian belief networks), expectation maximization, genetic algorithms, linear regression algorithms, nonlinear regression algorithms, logistic regression-based classification models, or an ensemble thereof. An "ensemble" can comprise a collection of models 122 whose outputs (classifications) are combined, such as by using weighted averaging or voting. The individual machine learning models of an ensemble can differ in their expertise, and the ensemble can operate as a committee of individual machine learning models that is collectively "smarter" than any individual machine learning model of the ensemble.

As mentioned, the output of the machine learning model(s) 122—which processes unknown data 116 as a subject for classification—may include, inter alia, a classification of the unknown data 116 as a type of data among different types of data corresponding to different levels of sensitivity. The output may include additional information as well, such as an object ID of the data object 110 that includes the "now-classified" data 116, an object name of the data object 110, and the like. The output of the machine learning model(s) 122 can be provided to the data security evaluation service 100 and used to identify a "sufficient" access policy 118 from a policy data store 124 that maps different "sufficient" access policies 118 to the different types of data by which data 116 can be classified. A "sufficient" access policy 118, as used herein, may represent an access policy 118 that provides a minimum level of data security for the type of data in question, or is otherwise regarded as satisfactory or adequate for the type of data it is mapped to in the policy data store 124. Accordingly, any access policy 118 that is more permissive than a sufficient access policy 118 can be regarded as an insufficient access policy, an overly-permissive access policy, an inadequate access policy, or the like. A satisfiability modulo theories (SMT) solver(s) 126 may be used to perform a data security evaluation by determining whether an existing access policy 118 associated with the storage container 108 is less secure, equal to (or of a similar security level as), and/or more secure than the sufficient access policy 118 identified from the policy data store 124.

In computer science and mathematical logic, "the SMT problem" is a decision problem for logical formulas with respect to combinations of background theories expressed in classical first-order logic with equality. Accordingly, the SMT solver(s) 126 may be a module(s) that is configured to solve a complex combinatorial problem defined by multiple constraints. For instance, the SMT solver(s) 126 may be configured to evaluate, in a comparative manner, a pair of access policies 118 to determine whether the pair of access policies 118 are "similar" or "different" (e.g., whether one is less secure or more secure than the other) based on mathematical reasoning (e.g., by applying decision logic and formulas). Due to the aforementioned complexity of some access policies 118, a SMT solver(s) 126 is well-suited to make a determination as to the sufficiency of an existing access policy 118 in terms of the level of data security it provides. In some embodiments, the SMT solver(s) 126 is configured to transform a pair of access policies 118 into a formula expressed in a background theory. The background theory in which the formula may be expressed may represent a theory of an access policy 118 data structure. That is, the background theory may supply the appropriate context to evaluate an access policy 118 (e.g., an IAM-based access policy) within a particular evaluation environment. The SMT solver(s) 126 can then process the formula in an attempt to find a solution(s) to the formula (e.g., a solution to the formula that satisfies all constraints of the formula), and based on this processing operation, the SMT solver(s) 126 generates a result as output, the result indicating whether a first access policy 118 is less secure, equal to (or of a similar security level as), or more secure than a second access policy 118. Thus, an existing access policy 118 presently applied to a storage container 108 can be evaluated, using the SMT solver(s) 126, as compared to a sufficient access policy 118 that is satisfactory for protecting the data 116 that is, or is requested to be, stored in the storage container 108.

In some embodiments, the SMT solver(s) 126 may be configured to evaluate the sufficiency of an existing access policy 118 by arriving at multiple solutions to a formula. For example, given a type of data that is, or is requested to be, stored in a storage container 108, there may be a "floor" (or baseline) level of data security that is needed to adequately secure the data, and there may be multiple access policies 118 (from least restrictive to most restrictive) that are deemed to be above that "floor" data security level. In this manner, the SMT solver(s) 126 may be configured to dynamically define what constitutes a "sufficient" access policy above that "floor" based on various factors, including the type of data that is, or is requested to be, stored, the customer 106 associated with the data, etc. Thus, the SMT solver(s) 126 may determine that an existing access policy is sufficient for protecting data in some cases, and may determine that the existing access policy is insufficient for protecting that data in other cases, depending on various factors.

The result that is output from the SMT solver(s) 126 may be a translated result that is in a format that can be processed by the data security evaluation service 100. The service 100 may receive the SMT result and determine whether an action(s) is to be performed. For example, the SMT result may be in the form of a "flag" or a notification that is interpreted by the service 100 as a data security deficiency (e.g., when an existing access policy 118 for a storage container 108 determined, by the SMT solver(s) 126, to be less secure than a sufficient access policy 118 for the type of data that is, or is requested to be, stored in the storage container 108).

Actions performed in response to a detected data security deficiency can vary. In some cases, a remedial action can be performed upon detecting a data security deficiency for a storage container 108, such as a remedial action that involves applying the sufficient access policy 118 to the storage container 108 (e.g., overwriting the existing access policy 118 with the sufficient access policy 118). This may be done automatically and without intervention from a customer 106 who is authorized to change the existing access policy 118 of the storage container 108. In some configurations, authorization from this customer 106 may be requested and received at any suitable time prior to applying the sufficient access policy 118 to the storage container 108. Accordingly, with customer authorization, the network-based storage system 114 can automatically "secure" storage containers 108 with a sufficient access policy 118 that provides at least a minimum level of protection for the data 116 that is, or is requested to be, stored in the storage container 108. In other examples, an action performed upon detecting a data security deficiency for a storage container 108 may be an alert action, which causes an alert to be sent to the customer 106 who is authorized to change the existing access policy 118 of the storage container 108. This alert can inform the customer 106 that the existing access policy is insufficient for protecting the data 116 in question, or that the data 116 will not be stored in the storage container 116 until the sufficient access policy 118 is applied to the storage container 108, or any similar notification.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 2:
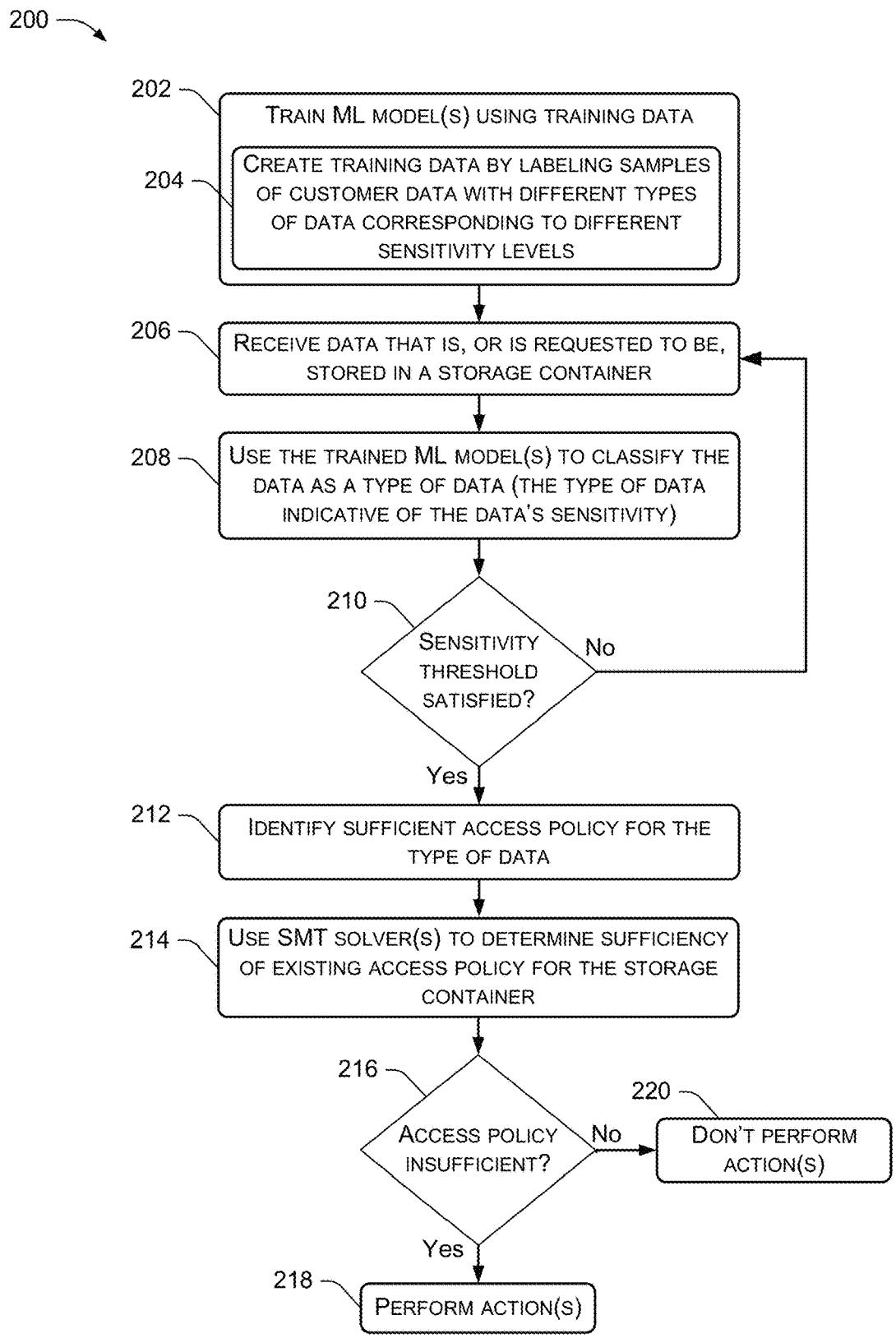
FIG. 2 is a flow diagram showing aspects of a process for evaluating the sufficiency of an existing storage container's access policy for storing data, and performing an action(s) if a data security deficiency is detected.

FIG. 2 is a flow diagram showing aspects of a process 200 for evaluating the sufficiency of an existing storage container's access policy for storing data, and performing an action(s) if a data security deficiency is detected. The process 200 is described, by way of example, with reference to FIGS. 1 and 3.

At 202, a machine learning model(s) 122 may be trained using training data 120 to generate a trained machine learning model(s) 122. As shown by sub-block 204, the training data 120 may be created by labeling samples of customer data—the customer data maintained by a network-based storage system 114—with different types of data corresponding to different sensitivity levels of the samples of the customer data. Thus, the training data 120 may include the samples of customer data that have been labeled with the different types of data. For example, the training data 120 may include samples of medical data labeled as "medical data" or "highly sensitive data," samples of personal data (e.g., PII or SPI) labeled as "personal data" or "sensitive data," and so on and so forth, for multiple different types of data that can be located on a sensitivity spectrum. As described herein, the operation(s) at sub-block 204 may be performed in an automated manner, without human intervention or involvement.

At 206, the data security evaluation service 100 may receive data 116 that is, or is requested to be, stored in a storage container, such as the storage container 108(P), maintained by the network-based storage system 114. Data 116 that is to be stored (but is not yet stored) in the storage container 108(P) may be received at block 206 as part of a data object 110 from a computing device 104(1) of a customer 106(1) as part of a request to store the data object 110 in the storage container 108(P) that is associated with the customer 106(1). In some configurations, data 116 that is to be stored (but is not yet stored) in the storage container 108(P) may alternatively be received at block 206 from a streaming source that continuously streams data 116 to the storage service 112. In some configurations, the data 116 received by the service 100 at block 206 may be already-stored data 116 that is stored in the storage container 108(P) and received by accessing the data 116 from the storage container 108(P). For instance, the receipt of the data 116 at block 206 may represent an operation of a background process to evaluate (e.g., on a periodic basis, such as hourly, daily, weekly, etc.) the data security of stored data 116 within the storage containers 108.

At 208, the data 116 received at block 206 may be classified as a type of data among different types of data using a trained machine learning model(s) 122. For example, the data security evaluation service 100 may provide the data 116 as a subject for classification to a trained machine learning model(s) 122, and the trained machine learning model(s) 122 may generate, as output therefrom, a classification of the data 116 as a type of data among multiple different types of data.

Figure 3:
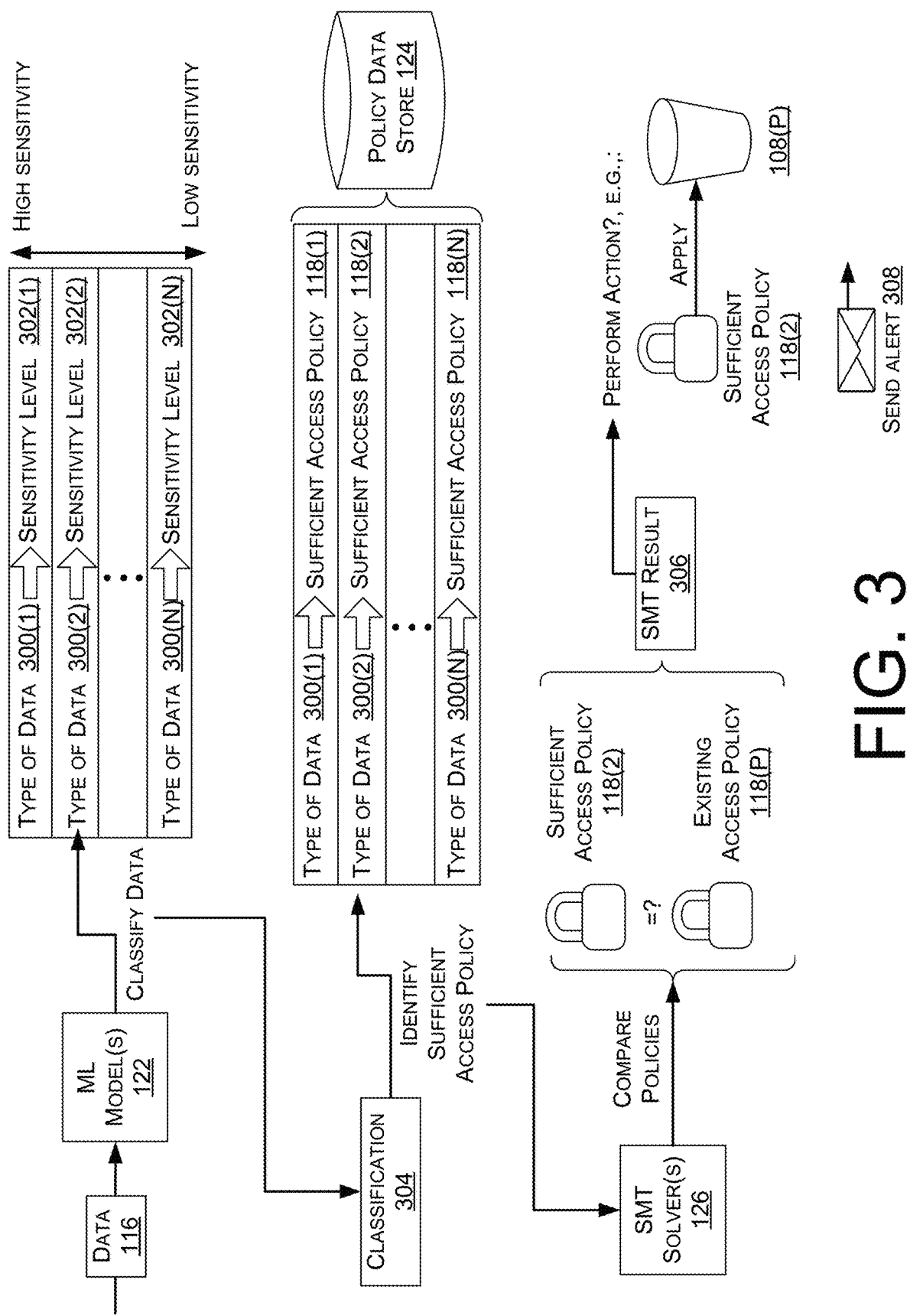
FIG. 3 is a schematic diagram illustrating example techniques that can be used in the context of the process described with reference to FIG. 2, the example techniques including the use of a trained machine learning model in combination with a satisfiability modulo theories (SMT) solver to evaluate the sufficiency of an existing access policy, and determining whether to perform an action(s) based on a result generated by the SMT solver.

Turning briefly to FIG. 3, the classification operation(s) described at block 208 of the process 200 is shown in terms of a schematic diagram. For example, data 116 is shown as being provided as a subject for classification to the trained machine learning model(s) 122, and the trained machine learning model(s) 122 may output, among other things, a classification 304, the classification 304 classifying the data 116 as a type of data 300 among multiple different types of data 300(1), 300(2), . . . , 300(N) (collectively 300) that correspond to different sensitivity levels 302(1), 302(2), . . . , 302(N) (collectively 302). In the example of FIG. 3, a first type of data 300(1) may represent, for example, medical data (i.e., data pertaining to a specific patient's health), which may correspond to a highest sensitivity level 302(1) on a sensitivity spectrum. Meanwhile, an $N^{th}$ type of data 300(N) may represent data that is not sensitive, or data that is of a lowest sensitivity level 302(N) on the sensitivity spectrum. In between the two extremes, there may be other intermediate types of data 300(2)-300(N−1) that correspond to intermediate sensitivity levels 302(2)-302(N−1) on the sensitivity spectrum, such as financial data, PII or SPI data, etc. FIG. 3 shows an example where the data 116 is classified as a particular type of data 300(2) corresponding to a particular sensitivity level 302(2) (or "level of sensitivity" 302(2)).

With reference again to FIG. 2, at 210, the sensitivity level 302(2) of the type of data 300(2) output by the machine learning model(s) 122 at block 208 may be used to determine if a threshold sensitivity level is satisfied. For example, if the type of data 300(2) output by the trained machine learning model(s) 122 corresponds to a sensitivity level 302(2)—among the different sensitivity levels 302(1)-(N)—that does not meet or exceed a threshold sensitivity level, the process 200 may follow the "no" route from block 210 by returning to block 206 where the data security evaluation service 100 waits to receive more data 116. This allows for selective data security evaluation, which may conserve computing resources (e.g., processing resources, etc.) of the system. For example, if the data 116 is classified, at block 208, as "non-sensitive" or a similarly low-sensitivity classification 304, it may be a waste of time and/or a waste of computing resources to perform the remainder of the process 200 because any access policy 118 may be "sufficient" to protect this type of data (or perhaps the data does not really need to be protected). On the other hand, if the type of data 300(2) output by the trained machine learning model(s) 122 corresponds to a sensitivity level 302(2)—among the different sensitivity levels 302(1)-(N)—that meets or exceeds a threshold sensitivity level, the process 200 may follow the "yes" route from block 210 to block 212.

At 212, the data security evaluation service 100 may identify a sufficient (or corresponding) access policy 118 for the type of data 300(2) output by the machine learning model(s) 122 at block 208. In an example, this sufficient access policy 118 may be identified from the policy data store 124 that maps different sufficient access policies 118(1)-(N) to the different types of data 300(1)-(N).

Turning briefly again to FIG. 3, an example policy data store 124 is shown in more detail with the different types of data 300(1)-(N) mapped to different sufficient access policies 118(1)-(N) for those types of data 300(1)-(N). The sufficient access policies 118(1)-(N) may be populated in the policy data store 124 in various ways. In some configurations, the sufficient access policies 118(1)-(N) in the policy data store 124 may be defined by an owner or operator of the service provider network 102 on an as-needed basis, using an administrator interface or console to define and map sufficient access policies 118(1)-(N) to types of data 300(1)-(N). In some embodiments, customer-defined access policies 118 that have already been applied to storage containers 108 may be analyzed with respect to the data 116 stored within those storage containers 108 to determine the sufficient access policies 118(1)-(N) in the policy data store 124. For example, metrics can be calculated to provide an indication of the most-effective customer-defined access policies 118, and these metrics used to select a sufficient access policy 118 for a given type of data 300 from customer-defined access policies 118 in the ecosystem. Because the service 100 has a global view across all customer data in the network-based storage system 114, the service 100 may be able to identify patterns in customer-defined access policies 118, such as a particular access policy 118 that tends to be applied by customers 106 to a particular type of data 300. Furthermore, the sufficient access policies 118(1)-(N) may be updated (e.g., when laws regarding data security change, periodically, etc.) to ensure the sufficient access policies 118(1)-(N) remain sufficient (or adequate) for protecting the types of data 300(1)-(N) to which they are mapped. The sufficient access policies 118(1)-(N) in the policy data store 124 may be defined at a level of granularity that is general enough to minimize the impact on the normal, day-to-day, operations performed by a customer 106 with respect to the customer's data 116. This may allow customers 106 to continue normal use of the storage service 112 even when a sufficient access policy 118 is automatically applied to a storage container 108 as a security measure.

As shown by the schematic diagram in FIG. 3, a classification 304 (e.g., a type of data 300(2)) output by the machine learning model(s) 122 can be used to lookup (or otherwise identify) a sufficient access policy 118(2) for the type of data 300(2) from the policy data store 124. This can correspond to the identification operation(s) performed at block 212 of FIG. 2.

With reference again to FIG. 2, at 214, the data security evaluation service 100 may determine, using a SMT solver(s) 126, whether an existing access policy 118(P) associated with the storage container 108(P) is sufficient for the data 116 that is, or is requested to be, stored in the storage container 108(P). To do this, the SMT solver(s) 126 may attempt to find a solution to a formula expressed in a background theory that indicates whether the existing access policy 118(P) is less secure, equal to (or of a similar security level as), or more secure than the sufficient access policy 118(2) identified, at block 212, for the type of data 300(2) output by the machine learning model(s) 122.

At 216, the SMT solver(s) 126 may generate a result (SMT result 306 in FIG. 3) to determine whether the existing access policy 118(P) is sufficient, by comparison to the sufficient access policy 118(2) identified at block 212. Turning briefly again to FIG. 3, consider an example where the existing access policy 118(P) happens to be an overly-permissive access policy 118(P) for the data 116 that is, or is requested to be, stored in the storage container 108(P). In this case, the SMT solver(s) 126 will generate a result 306 as output that indicates the existing access policy 118(P) is insufficient as compared to the sufficient access policy 118(2) (e.g., less secure than the sufficient access policy 118(2)).

Returning again to FIG. 2, when the SMT result 306 indicates that the existing access policy 118(P) is insufficient for protecting the data 116 that is, or is requested to be, stored in the storage container 108(P), the process 200 may follow the "yes" route from block 216 to block 218 where an action(s) may be performed based on the data security deficiency that was detected at block 216. Otherwise, if the existing access policy 118(P) is determined, at block 216, to be "sufficient" (e.g., equal to (or of a similar security level as) the security level of the sufficient access policy 118(2), or more secure than the sufficient access policy 118(2)), the process 200 may follow the "no" route from block 216 to block 220 where an action(s) (e.g., the action(s) that would have been performed at block 218) is not performed.

As shown in the schematic diagram of FIG. 3, in the case where an action(s) is performed at block 218 of the process 200, the action(s) may be performed in an attempt to remedy or cure the data security deficiency, such as by applying the sufficient access policy 118(2) to the storage container 108(1) on behalf of the customer 106 (e.g., overwriting the existing access policy 118(P) as a means of upgrading the security of the storage container 108(P)). Other actions that can be performed at block 218 of the process 200 are contemplated herein, such as actions that include sending an alert 308 to the customer 106, as depicted in FIG. 3. An alert 308 may be sent in any suitable format, such as an electronic mail (email) message, a text message, a push notification via an application or console executing on a computing device 104 of the customer 106, and so on. In some cases multiple actions can be performed at block 218 of the process 200, such as automatically applying the sufficient access policy 118(2) to the storage container 108(P) and sending an alert 308 to a customer 106 who is authorized to change the existing access policy 118(P) associated with the storage container 108(P).

Figure 4:
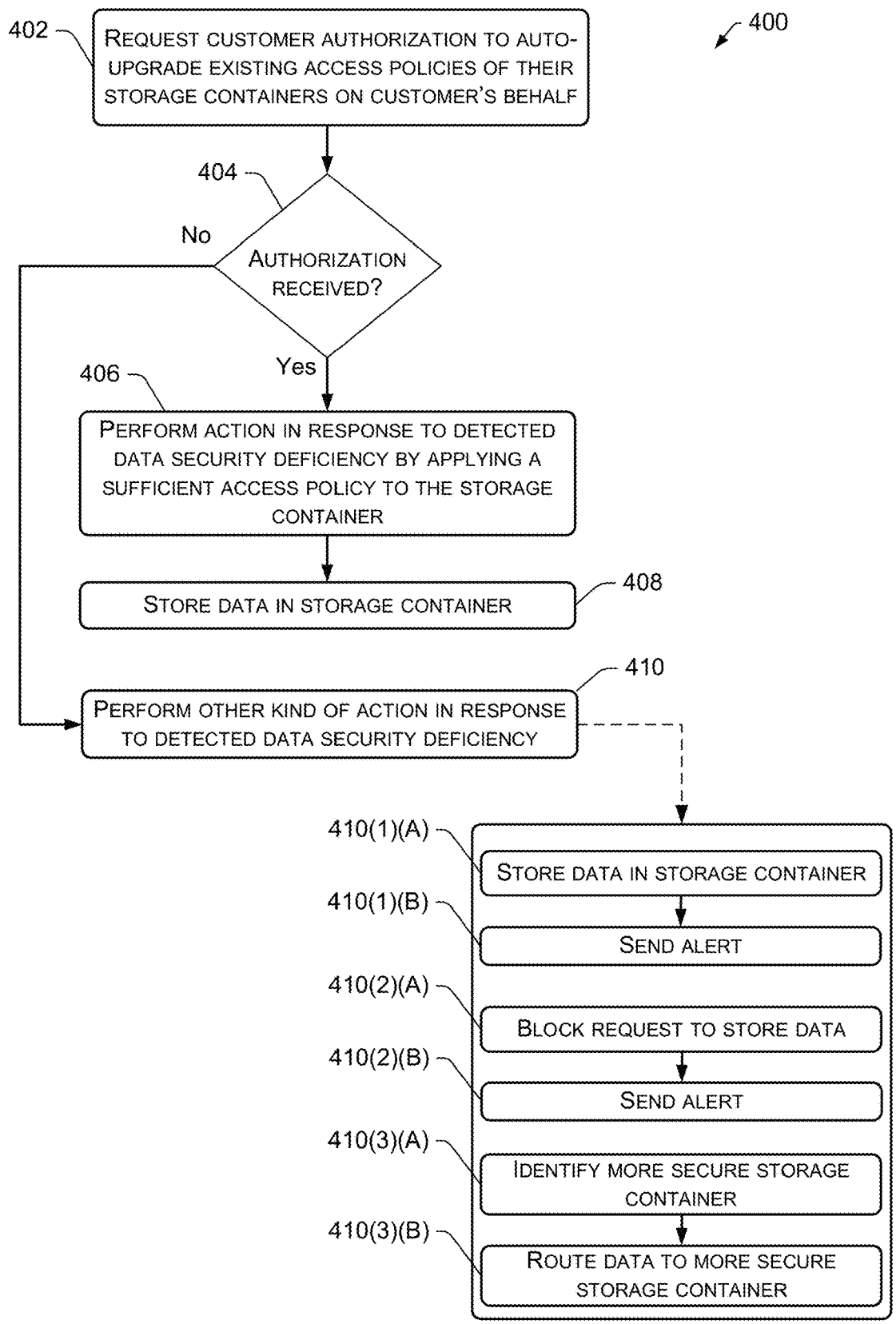
FIG. 4 is a flow diagram showing aspects of a process for requesting customer authorization to perform a particular action(s) with respect to automatic data security adjustments, and performing the particular action(s), or a different action(s), in response to a detected data security deficiency.

FIG. 4 is a flow diagram showing aspects of a process 400 for requesting customer authorization to perform a particular action(s) with respect to automatic data security adjustments, and performing the particular action(s), or a different action(s), in response to a detected data security deficiency. The process 400 is described, by way of example, with reference to the previous figures.

At 402, the data security evaluation service 100 may request authorization from a customer 106—who is authorized to change one or more existing access policies 118 of one or more corresponding storage containers 108—to automatically upgrade the one or more existing access policies 118 on the customer's behalf, such as by applying a sufficient (or corresponding) access policy 118 to a storage container 108 (e.g., overwriting the existing access policy 118 with a sufficient access policy 118). The timing of this authorization request at block 402 may vary. For example, the request for customer authorization at block 402 may be issued to the customer 106 prior to receiving data 116 that is requested to be stored in one or more of the customer's storage containers 108, such as a request for the customer to opt-in to an automatic upgrade service for storage container access policies.

Figure 5:
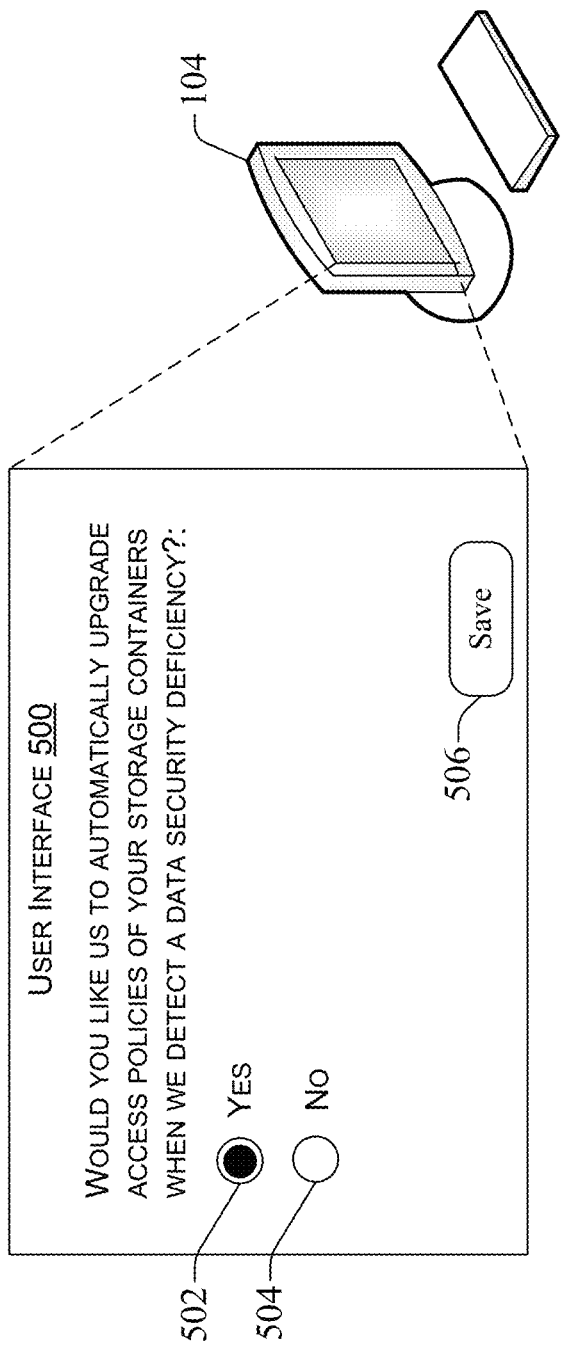
FIG. 5 illustrates an example user interface for requesting and receiving customer authorization to automatically upgrade access policies.

Turning briefly to FIG. 5, an example user interface 500 is shown for requesting and receiving customer authorization to automatically upgrade access policies 118 of the customer's storage containers 108. As shown, the user interface 500 may include a first selectable option 502 that, when selected, and when a save button 506 is selected, authorizes the data security evaluation service 100 to automatically upgrade access policies 118 on the customer's behalf. The user interface 500 may further include a second selectable option 504 that, when selected, and when a save button 506 is selected, does not authorize the service 100 to automatically upgrade access policies 118 on the customer's behalf. Thus, the request for customer authorization at block 402 of the process 400 may include causing display of a user interface, such as the user interface 500, on a display of a computing device 104 of the customer 106, the user interface 500 presenting the authorization request with selectable options 502 and 504 (and button 506 to save customer settings).

In another example, the authorization request at block 402 of the process 400 may be issued to the customer 106 after detecting a data security deficiency, such as after receiving data 116 the customer 106 is requesting to store in a storage container 108, and after determining that an existing access policy 118 associated with the storage container 108 is less secure than a sufficient access policy 118 for the type of data that the customer 106 is requesting to store in the storage container 108. This authorization request may be provided at a time when the customer 106 has requested to upload data 116 into the storage container 108, for example, and, after detecting a data security deficiency at block 216 of the process 200, for example, the authorization request 402 may be issued to the customer 106 to determine if the customer 106 would like the service 100 to upgrade the access policy 118 of the storage container 108. In this example, the authorization request at block 402 is issued to the customer 106 in substantially real-time when the customer 106 is attempting to upload data 116.

At 404, the data security evaluation service 100 may determine whether customer authorization has been received in response to the request at block 402. For example, the customer 106 may have selected the first selectable option 502 via the user interface 500 to provide the authorization, and, in response to receiving this customer authorization, the process 400 may follow the "yes" route from block 404 to block 406.

At 406, the data security evaluation service 100 may, in response to detecting a data security deficiency (e.g., upon following the "yes" route from block 216 of the process 200), perform an action by applying the sufficient (or corresponding) access policy 118—identified from the policy data store 124—to the storage container 108. This action at block 406 may be performed without intervention from the customer 106 who has access to change the existing access policy 118 associated with the storage container 108 (that is, other than the customer 106 providing authorization at block 404). For example, at any time prior to performing the operation(s) at block 406, the customer 106 can assent to the automatic upgrade, and, at block 406, the existing access policy 118 can be upgraded on the customer's behalf, without further involvement from the customer 106. Furthermore, applying the sufficient access policy 118 to the storage container 108 can include applying the sufficient access policy 118 on any level (e.g., to the storage container 108 as a whole, to a folder within the storage container 108, to a data object 110 within the storage container 108, etc.)

At 408, the data 116 may be stored in the storage container 108 in response to applying the sufficient access policy 118 to the storage container 108. In other words, upon receiving customer authorization to do so, the storage container's access policy can be upgraded, at block 406, to a more secure access policy (e.g., by applying the sufficient access policy 118 for the type of data that is to be stored in the storage container 108). After upgrading the existing access policy to the more secure access policy at block 406, the data 116 may be stored, at block 408, in the designated storage container 108, which now has an adequate level of data security applied thereto for protecting the data 116.

At 404, if, on the other hand, customer authorization is not received, the process 400 may follow the "no" route from block 404 to block 410 where another (different) action(s) can be performed in response to detecting a data security deficiency (e.g., upon following the "yes" route from block 216 of the process 200). For example, at 410(1)(A), the data security evaluation service 100 may perform an action that includes storing the data 116 in the storage container 108, and at 410(1)(B), the service 100 may perform an action that includes sending an alert 308 to the customer 106 who is authorized to change the existing access policy 118 of the storage container 108, the alert 308 indicating that the existing access policy 118 is insufficient for protecting the data 116. Thus, the customer 106, upon receiving the alert 308 sent at block 410(1)(B), may take some action, such as deleting the data 116, upgrading the existing access policy 118 on their own, or any other action the customer 106 would like to take in light of the data security deficiency. As another example, at 410(2)(A), the service 100 may perform an action that includes blocking a request to store the data 116, such as the service 100 refraining from storing the data 116 in the storage container 108, and at 410(2)(B), the service 100 may perform an action that includes sending an alert 308 to the customer 106 who is authorized to change the existing access policy 118 of the storage container 108, the alert 308 informing the customer 106 that the data 116 will not be stored in the storage container 108 until the existing access policy 118 for the storage container 108 is upgraded (e.g., until the sufficient access policy 118 for the type of data to be stored in the storage container 108 is applied to the storage container 108). Thus, a customer 106 attempting to upload data 116 to a storage container 108 may receive the alert 308 that was sent at 410(2)(B), and may take some action based on the alert 308, such as aborting the request to store the data 116 in the storage container 108, upgrading the existing access policy 118 on their own, or any other action the customer 106 would like to take in light of the data security deficiency. As noted above, alerts 308, such as those sent at blocks 410(1)(B) or 410(2)(B), may be sent in any suitable format, such as email, text, push notifications via an application or console interface on the customer's 106 computing device 104, etc. As yet another example, at 410(3)(A), the service 100 may perform an action that includes identifying a different storage container 108 associated with the customer 106 that is associated with a suitable access policy 118 for the data 116 in question, and at 410(3)(B), the service 100 may route the data 116 to the identified storage container 108 with the sufficient data security for the data 116 to be stored therein. For instance, a customer 106 may have multiple storage containers 108 with different access policies 118, and that customer 106 may attempt to upload highly sensitive data 116 to one of his/her storage containers 108 that is not suitable for storing this highly sensitive data 116. The service 100 may, in detecting the data security deficiency of this storage container 108, may look for another of the customer's 106 storage containers 108 with the appropriate data security level, and may route the data 116 to such a storage container 108, if such a storage container is available.

Figure 6:
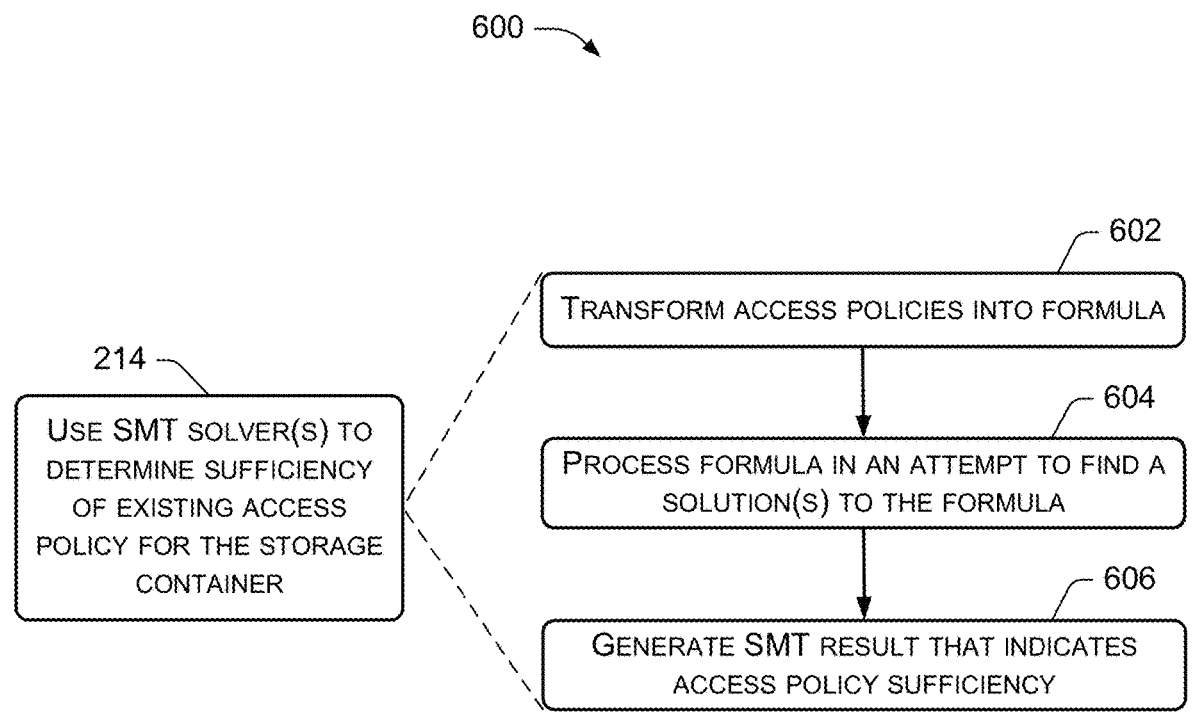
FIG. 6 is a flow diagram showing aspects of a process for evaluating an existing access policy for a storage container using a SMT solver(s).

FIG. 6 is a flow diagram showing aspects of a process 600 for evaluating an existing access policy for a storage container using a SMT solver(s). The process 600 is described, by way of example, with reference to the previous figures, and the process 600 may represent a sub-process of block 214 of the process 200 of FIG. 2.

At 602, after a sufficient (or corresponding) access policy 118 has been identified for a type of data classified by the machine learning model(s) 112, a SMT solver(s) 126 may be used to transform an existing access policy 118—for the storage container 108 where the data is, or is requested to be, stored—and the sufficient access policy 118 into a formula expressed in a background theory.

At 604, the formula may be processed with the SMT solver(s) 126 in an attempt to find a solution(s) to the formula. For example, the SMT solver(s) 126 may attempt to find a solution to the formula that satisfies all constraints of the formula. In some embodiments, multiple solutions can be found for a formula.

At 606, the SMT solver(s) 126 may generate a result 306 as output based at least in part on the processing at block 604, wherein the result indicates the sufficiency of the existing access policy 118 (e.g., whether the existing access policy 118 for the storage container 108 is less secure, equal to (at a security level similar to), or more secure than the sufficient access policy 118. Using the SMT solver(s) 126 in the process 600 allows the service 100 to evaluate the existing data security of access policies 118 of potentially high complexity.

Figure 7:
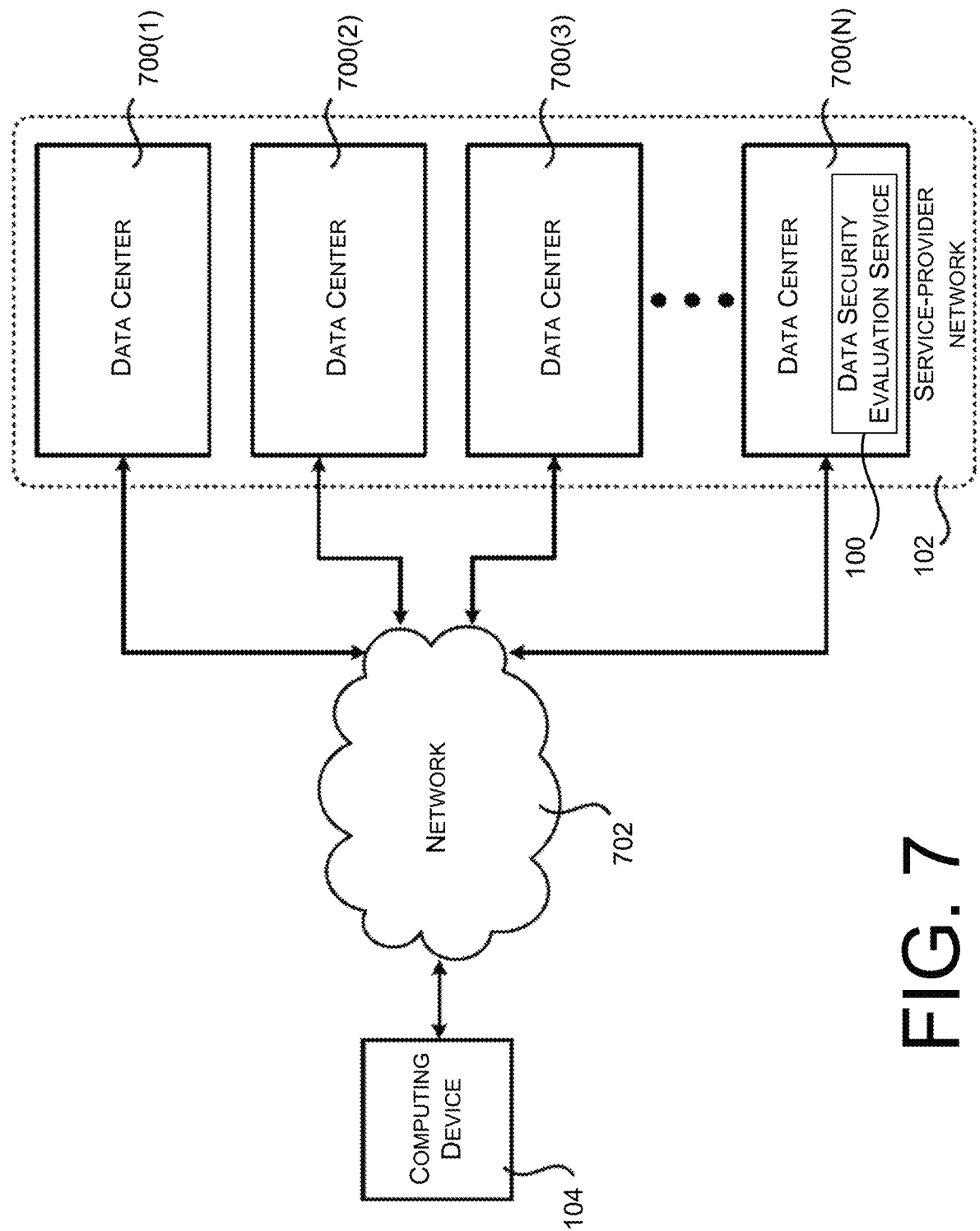
FIG. 7 is a system and network diagram that shows an illustrative operating environment that includes a service provider network that can be configured to implement aspects of the functionality described herein.

FIG. 7 is a system and network diagram that shows one illustrative operating environment for the configurations disclosed herein that includes a service provider network 102 that can be configured to execute the storage service 112, the data security evaluation service 100, and the other network services described herein, according to one particular configuration. As discussed briefly above, the service provider network 102 can execute network services that provide computing resources on a permanent or an as-needed basis. Among other types of functionality, the computing resources provided by the service provider network 102 can be utilized to implement the various network services described herein. As also discussed above, the computing resources provided by the service provider network 102 can be data storage resources (e.g., storage containers 108, data objects 110, etc.), data processing resources, such as VM instances, networking resources, data communication resources, network services, and other types of resources.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 are enabled in one implementation by one or more data centers 700(1)-(N) (collectively 700). The data centers 700 are facilities utilized to house and operate computer systems and associated components. The data centers 700 typically include redundant and backup power, communications, cooling, and security systems. The data centers 70 can also be located in geographically disparate locations. One illustrative configuration for a data center 700 that can be utilized to implement the technologies disclosed herein will be described below with regard to FIG. 8. For example, the data center 700(N) is shown as implementing the data security evaluation service 100 described herein.

The customers 106 of the service provider network 102 can access the computing resources provided by the service provider network 102 over a network 702, which can be a wide area communication network ("WAN"), such as the Internet, an intranet or an Internet service provider ("ISP") network or a combination of such networks. For example, and without limitation, a computing device 104 operated by a customer 106 of the service provider network 102 can be utilized to access the service provider network 102 by way of the network 702. It should be appreciated that a local-area network ("LAN"), the Internet, or any other networking topology known in the art that connects the data centers 700 to remote customers and other users can be utilized. It should also be appreciated that combinations of such networks can also be utilized.

Figure 8:
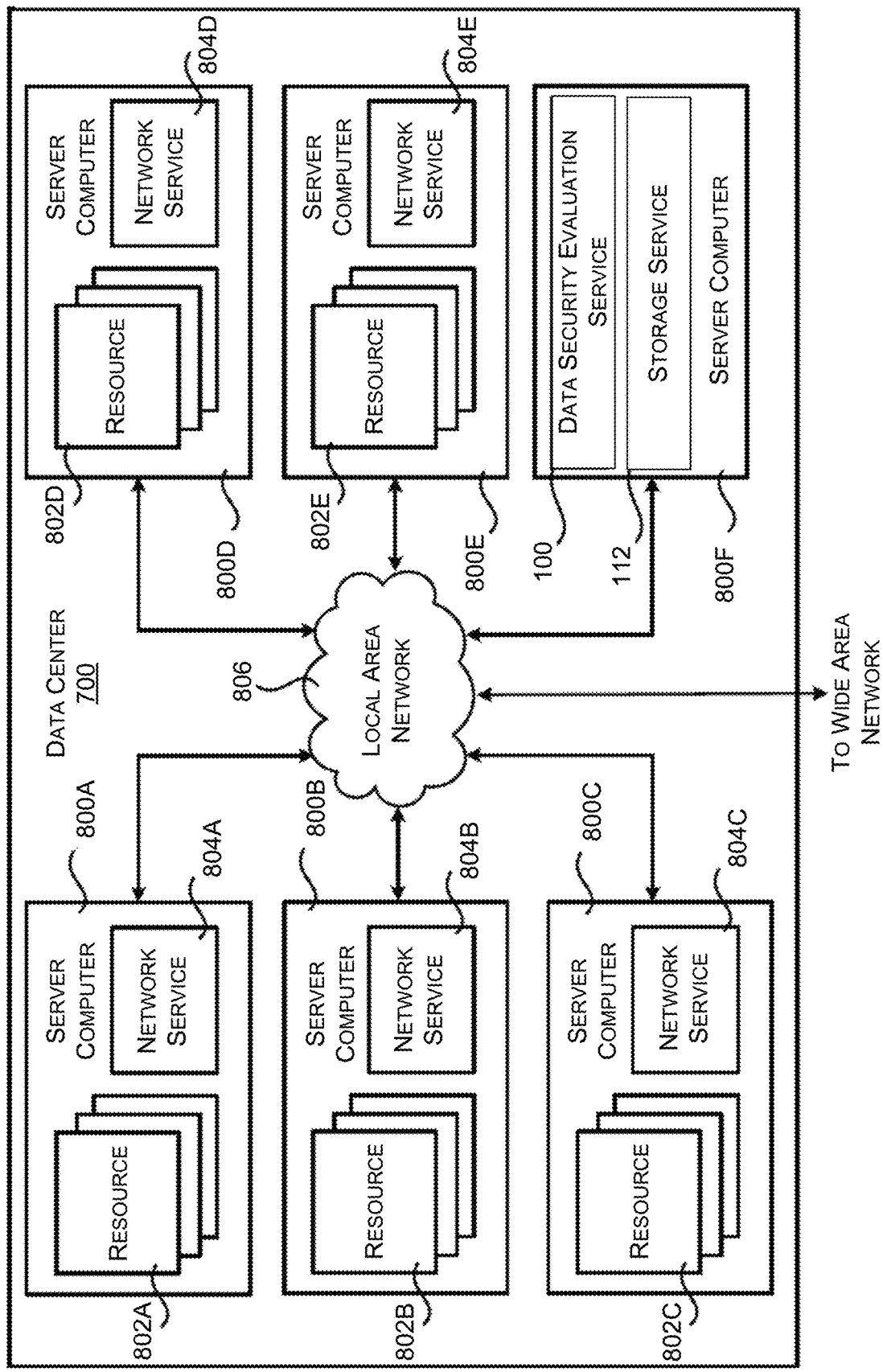
FIG. 8 is a computing system diagram illustrating a configuration for a data center that can be utilized to implement aspects of the technologies disclosed herein.

FIG. 8 is a computing system diagram that illustrates one configuration for a data center 700 that can be utilized to implement the storage service 112, the data security evaluation service 100, and the other network services disclosed herein. The example data center 700 shown in FIG. 8 includes several server computers 800A-800E (collectively 800) for providing the computing resources 802A-802E, respectively.

The server computers 800 can be standard tower, rack-mount, or blade server computers configured appropriately for providing the various computing resources described herein (illustrated in FIG. 8 as the computing resources 802A-802E). As mentioned above, the computing resources 802 provided by the service provider network 102 can be data storage resources (e.g., storage containers 108, data objects 110, etc.), data processing resources such as VM instances or hardware computing systems, database resources, networking resources, and others. Some of the servers 800 can also be configured to execute network services 804A-804E capable of instantiating, providing and/or managing the computing resources 802, some of which are described in detail herein.

The data center 700 shown in FIG. 8 also includes a server computer 800F that can execute some or all of the software components described above. For example, and without limitation, the server computer 800F can be configured to execute the storage service 112 and the data security evaluation service 100, both of which were described in detail above. The server computer 800F can also be configured to execute other components and/or to store data for providing some or all of the functionality described herein. In this regard, it should be appreciated that components or different instances of the storage service 112 and the data security evaluation service 100 can execute on many other physical or virtual servers in the data centers 700 in various configurations.

In the example data center 700 shown in FIG. 8, an appropriate LAN 806 is also utilized to interconnect the server computers 800A-800F. The LAN 806 is also connected to the network 702 illustrated in FIG. 7. It should be appreciated that the configuration of the network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 700(1)-(N), between each of the server computers 800A-800F in each data center 700, and, potentially, between computing resources 802 in each of the data centers 700. It should be appreciated that the configuration of the data center 700 described with reference to FIG. 8 is merely illustrative and that other implementations can be utilized.

Figure 9:
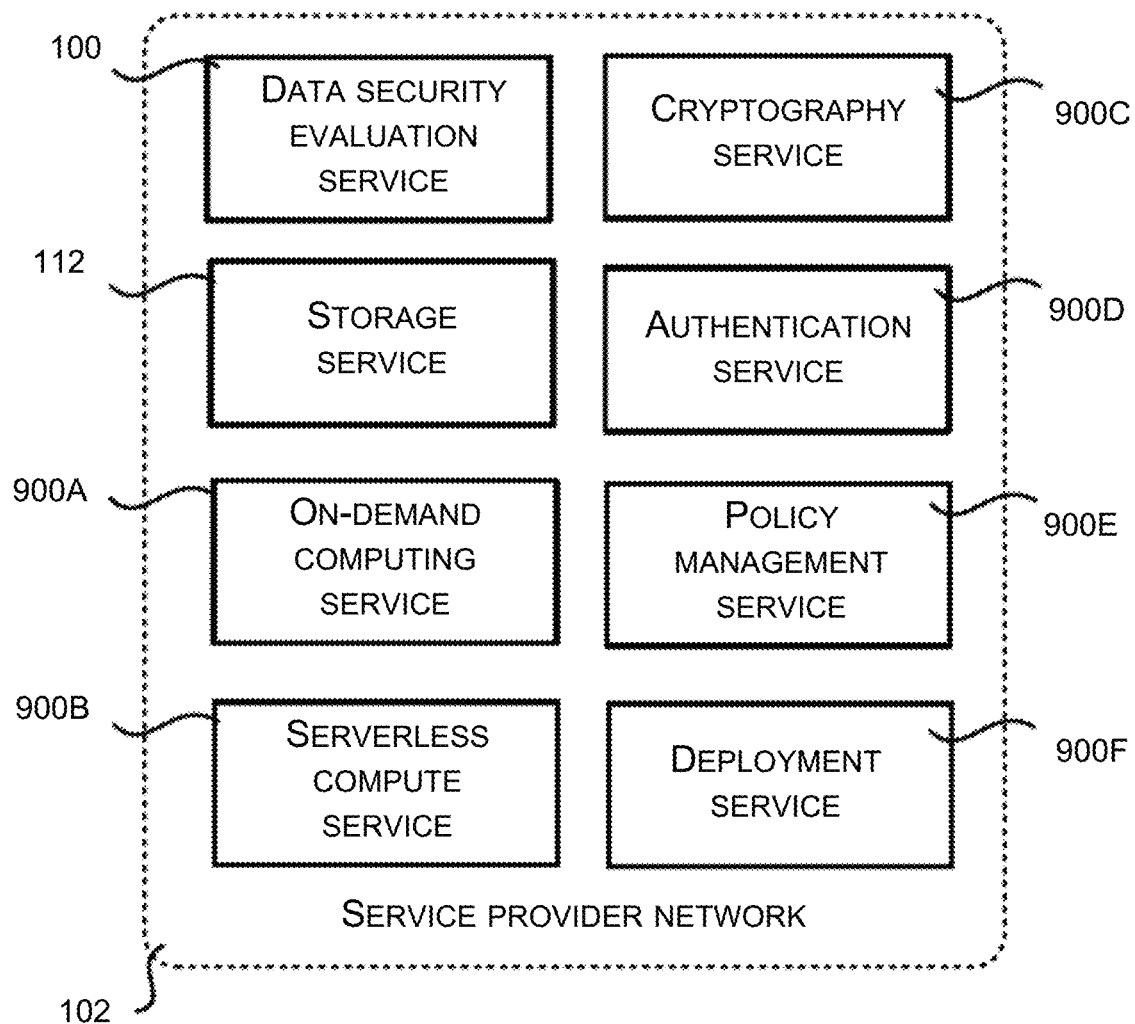
FIG. 9 is a network services diagram that shows aspects of several services that can be provided by and utilized within a service provider network configured to implement the various technologies disclosed herein.

FIG. 9 is a system and network diagram that shows aspects of several network services that can be provided by and utilized within a service provider network 102 in one configuration disclosed herein. In particular, and as discussed above, the service provider network 102 can provide a variety of network services to customers and other users of the service provider network 102 including, but not limited to, the storage service 112, the data security evaluation service 100, an on-demand computing service 900A, a serverless compute service 900B, a cryptography service 900C, an authentication service 900D, a policy management service 900E, and a deployment service 900F. The service provider network 102 can also provide other types of network services, some of which are described below. It is to be appreciated that the network-based storage system 114 described herein may be associated with any of these network-based services 900, or any other network service in addition, or alternatively, to the network-based storage system 114 being associated with the storage service 112. In some cases, these other types of services 900 and similar network services may be regarded as a "storage service" in that they provide storage containers 108 to store data.

It is to be appreciated that users of the service provider network 102 can include organizations or individuals that utilize some or all of the network services provided by the service provider network 102. As described above, customers 106 can communicate with the service provider network 102 using an appropriate computing device 104 through a network, such as the network 702 shown in FIG. 7.

It is also noted that not all configurations described include the network services shown in FIG. 9 and that additional network services can be provided in addition to, or as an alternative to, the services explicitly described herein. Each of the services shown in FIG. 9 can also expose web service interfaces that enable a caller to submit appropriately configured API calls to the various services through web service requests. The various web services can also expose GUIs, command line interfaces ("CLIs"), and/or other types of interfaces for accessing the functionality that they provide. In addition, each of the services can include service interfaces that enable the services to access each other. Additional details regarding some of the services shown in FIG. 9 will now be provided.

The on-demand computing service 900A can be a collection of computing resources configured to instantiate VM instances and to provide other types of computing resources 802 on demand. For example, a customer of the service provider network 102 can interact with the on-demand computing service 900A (via appropriately configured and authenticated API calls, for example) to provision and operate VM instances that are instantiated on physical computing devices hosted and operated by the service provider network 102. The VM instances can be used for various purposes, such as to operate as servers supporting the network services described herein, a web site, to operate business applications or, generally, to serve as computing resources for the customer.

Other applications for the VM instances can be to support database applications, electronic commerce applications, business applications and/or other applications. Although the on-demand computing service 900A is shown in FIG. 9, any other computer system or computer system service can be utilized in the service provider network 102 to implement the functionality disclosed herein, such as a computer system or computer system service that does not employ virtualization and instead provisions computing resources on dedicated or shared computers/servers and/or other physical devices.

The serverless compute service 900B is a network service that allows customers to execute code (which might be referred to herein as a "function") without provisioning or managing server computers in the service provider network 102. Rather, the serverless compute service 900B can automatically run code in response to the occurrence of events. The code that is executed can be stored by the storage service 112 or in another network accessible location.

In this regard, it is to be appreciated that the term "serverless compute service" as used herein is not intended to infer that servers are not utilized to execute the program code, but rather that the serverless compute service 900B enables code to be executed without requiring a user to provision or manage server computers. The serverless compute service 900B executes program code only when needed, and only utilizes the resources necessary to execute the code. In some configurations, the user or entity requesting execution of the code might be charged only for the amount of time required for each execution of their program code.

The service provider network 102 can also include a cryptography service 900C. The cryptography service 900C can utilize storage services of the service provider network 102, such as the storage service 112, to store encryption keys in encrypted form, whereby the keys can be usable to decrypt user keys accessible only to particular devices of the cryptography service 900C. The cryptography service 900C can also provide other types of functionality not specifically mentioned herein.

As illustrated in FIG. 9 and discussed above, the service provider network 102, in various configurations, also includes an authentication service 900D and a policy management service 900E. The authentication service 900D, in one example, is a computer system (i.e., collection of computing resources 802) configured to perform operations involved in authentication of customers or users. For instance, one of the services shown in FIG. 9 can provide information from a customer of the authentication service 900D to receive information in return that indicates whether or not the requests submitted by the customer are authentic.

The policy management service 900E, in one example, is a network service configured to manage policies (e.g., access policies 118) on behalf of customers of the service provider network 102. The policy management service 900E can include an interface (e.g. API or GUI) that enables customers to submit requests related to the management of a policy, such as a security policy or an access policy 118. Such requests can, for instance, be requests to add, delete, change or otherwise modify a policy for a customer, service, or system, or for other administrative actions, such as providing an inventory of existing policies and the like.

The service provider network 102 can additionally maintain other network services based, at least in part, on the needs of its customers. For instance, the service provider network 102 can maintain a deployment service 900F for deploying program code in some configurations. The deployment service 900F provides functionality for deploying program code, such as to virtual or physical hosts provided by the on-demand computing service 900A. Other services include, but are not limited to, database services, object-level archival data storage services, and services that manage, monitor, interact with, or support other services. The service provider network 102 can also be configured with other network services not specifically mentioned herein in other configurations.

Figure 10:
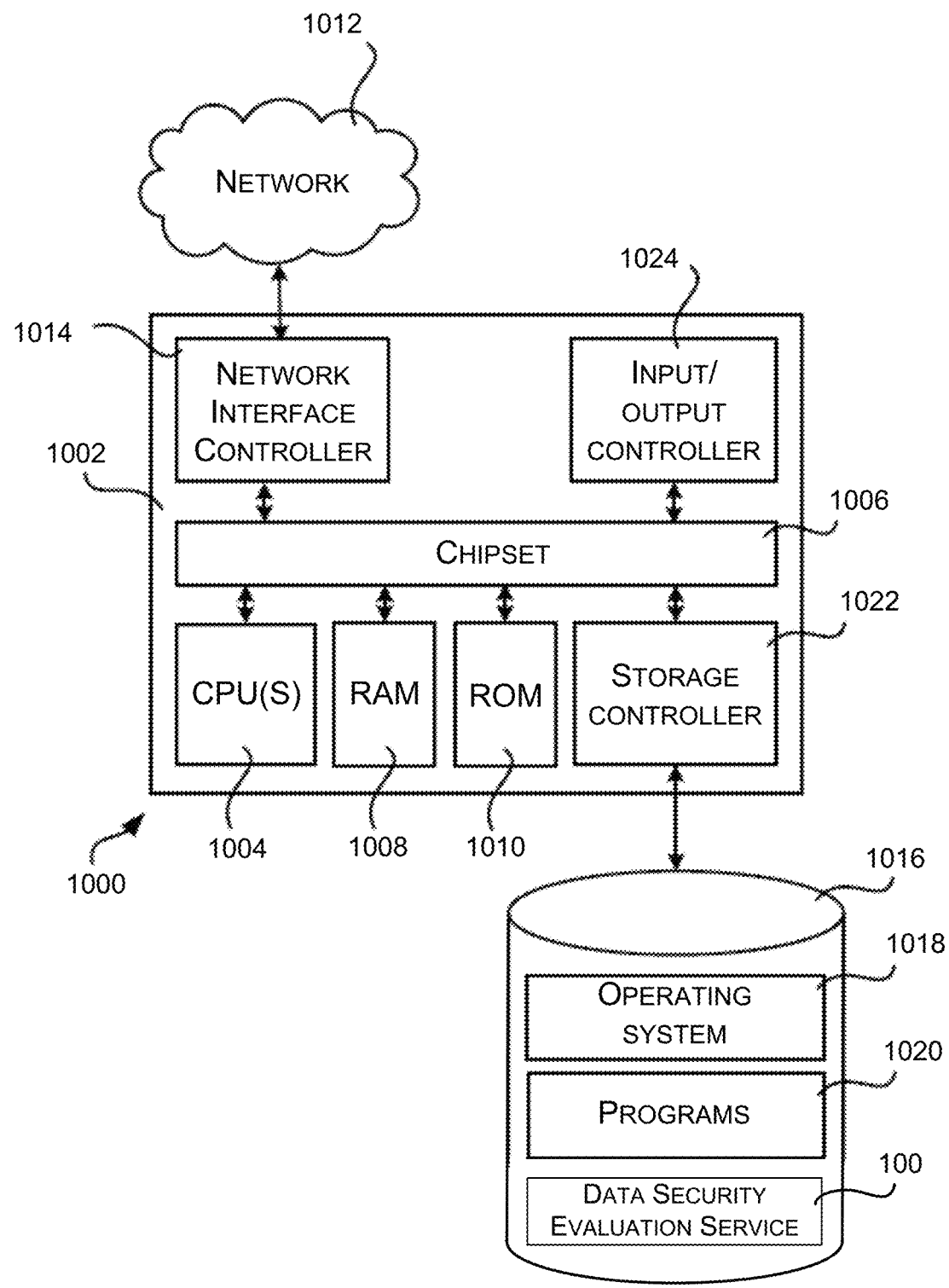
FIG. 10 is a computer architecture diagram showing an illustrative computer hardware architecture for implementing a computing device that can be utilized to implement aspects of the various technologies presented herein.

FIG. 10 shows an example computer architecture for a computer 1000 capable of executing program components for implementing the functionality described above. The computer architecture shown in FIG. 10 illustrates a conventional server computer, workstation, desktop computer, laptop, tablet, network appliance, e-reader, smartphone, or other computing device, and can be utilized to execute any of the software components presented herein.

The computer 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network, such as the network 1012. The chipset 1006 can include functionality for providing network connectivity through a NIC 1014, such as a gigabit Ethernet adapter. The NIC 1014 is capable of connecting the computer 1000 to other computing devices over the network 1012. It should be appreciated that multiple NICs 1014 can be present in the computer 1000, connecting the computer to other types of networks and remote computer systems.

The computer 1000 can be connected to a mass storage device 1016 that provides non-volatile storage for the computer. The mass storage device 1016 can store an operating system 1018, programs 1020, one or more components of the data security evaluation service 100, and data, which have been described in greater detail herein. The mass storage device 1016 can be connected to the computer 1000 through a storage controller 1022 connected to the chipset 1006. The mass storage device 1016 can consist of one or more physical storage units. The storage controller 1022 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 can store data on the mass storage device 1016 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 1016 is characterized as primary or secondary storage, and the like.

For example, the computer 1000 can store information to the mass storage device 1016 by issuing instructions through the storage controller 1022 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the mass storage device 1016 by detecting the physical states or characteristics of one or more particular locations within the physical storage units.

In addition to the mass storage device 1016 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1016 can store an operating system 1018 utilized to control the operation of the computer 1000. According to one configuration, the operating system comprises the LINUX operating system or one of its variants such as, but not limited to, UBUNTU, DEBIAN, and CENTOS. According to another configuration, the operating system comprises the WINDOWS SERVER operating system from MICROSOFT Corporation. According to further configurations, the operating system can comprise the UNIX operating system or one of its variants. It should be appreciated that other operating systems can also be utilized. The mass storage device 1016 can store other system or application programs and data utilized by the computer 1000.

In one configuration, the mass storage device 1016 or other computer-readable storage media is encoded with computer-executable instructions which, when loaded into the computer 1000, transform the computer from a general-purpose computing system into a special-purpose computer capable of implementing the configurations described herein. These computer-executable instructions transform the computer 1000 by specifying how the CPUs 1004 transition between states, as described above. According to one configuration, the computer 1000 has access to computer-readable storage media storing computer-executable instructions which, when executed by the computer 1000, perform the various processes described above. The computer 1000 can also include computer-readable storage media storing executable instructions for performing any of the other computer-implemented operations described herein.

The computer 1000 can also include one or more input/output controllers 1024 for receiving and processing input from a number of input devices, such as a keyboard, a mouse, a touchpad, a touch screen, an electronic stylus, or other type of input device. Similarly, an input/output controller 1024 can provide output to a display, such as a computer monitor, a flat-panel display, a digital projector, a printer, or other type of output device. It is to be appreciated that the computer 1000 might not include all of the components shown in FIG. 10, can include other components that are not explicitly shown in FIG. 10, or can utilize an architecture completely different than that shown in FIG. 10.

Based on the foregoing, it should be appreciated that technologies for providing a network service capable of automatically evaluating and adjusting data security have been disclosed herein. Moreover, although the subject matter presented herein has been described in language specific to computer structural features, methodological acts, and computer readable media, it is to be understood that the appended claims are not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the following claims.

What is claimed is:

1. A system comprising:
    one or more processors; and
    memory storing computer-executable instructions which, when executed by the one or more processors, cause the system to:
        create training data by labeling samples of customer data maintained by a network-based storage system with different types of data corresponding to different sensitivity levels of the samples of the customer data;
        train a machine learning model using the training data to generate a trained machine learning model;
        receive a data object from a computing device of a customer as part of a request to store the data object in a storage container that is associated with the customer and that is maintained by the network-based storage system;
        provide data of the data object as a subject for the trained machine learning model to classify among the different types of data;
        generate, as output from the trained machine learning model, a classification of the data as a type of data among the different types of data;
        identify, from a policy data store that maps different access policies to the different types of data, a corresponding access policy that maps to the type of data;
        determine, using a satisfiability modulo theories (SMT) solver, that an existing access policy for the storage container is less secure than the corresponding access policy; and
        alter, by the network-based storage system and based on the existing access policy being less secure than the corresponding access policy, the existing access policy for the storage container to the corresponding access policy.

2. The system of claim 1, wherein the computer-executable instructions, when executed by the one or more processors, further cause the system to store the data object in the storage container in response to altering to the corresponding access policy for the storage container.

3. The system of claim 1, wherein determining, using the SMT solver, that the existing access policy for the storage container is less secure than the corresponding access policy comprises:
    transforming the existing access policy and the corresponding access policy into a formula expressed in a background theory;
    processing the formula with the SMT solver in an attempt to find a solution to the formula; and
    generating a result as second output of the SMT solver based on the processing, wherein the result indicates that the existing access policy for the storage container is less secure than the corresponding access policy.

4. A computer-implemented method comprising:
creating training data by labeling samples of customer data maintained by a network-based storage system with different types of data corresponding to different sensitivity levels of the samples of the customer data;
training a machine learning model using the training data to generate a trained machine learning model;
receiving data that is, or is requested to be, stored in a storage container maintained by the network-based storage system;
classifying the data as a type of data among the different types of data using the trained machine learning model;
identifying a corresponding access policy that corresponds to the type of data;
determining, using a module configured to solve a formula expressed in first-order logic, that an existing access policy associated with the storage container is less secure than the corresponding access policy, wherein the existing access policy specifies one or more first sources that are allowed or denied access to the storage container, and wherein the corresponding access policy defines one or more second sources different from the one or more first sources that are allowed or denied access to the storage container; and
performing an action based at least in part on the determining that the existing access policy is less secure than the corresponding access policy, wherein the action comprises at least one of:
altering the existing access policy for the storage container to the corresponding access policy;
sending an alert to a customer who is authorized to change the existing access policy of the storage container, the alert indicating that the existing access policy is insufficient for protecting the data; or
storing the data in a different storage container associated with a different access policy that is as secure as, or more secure than, the corresponding access policy.

5. The computer-implemented method of claim 4, wherein the action comprises the altering of the existing access policy.

6. The computer-implemented method of claim 5, further comprising receiving, prior to the receiving of the data and from the customer, authorization to automatically upgrade storage container access policies on behalf of the customer, wherein the altering of the existing access policy occurs without intervention from the customer based at least in part on the authorization.

7. The computer-implemented method of claim 5, further comprising requesting, after the determining that the existing access policy associated with the storage container is less secure than the corresponding access policy and from the customer, authorization to apply the corresponding access policy to the storage container, wherein the altering of the existing access policy occurs in response to receiving the authorization.

8. The computer-implemented method of claim 5, further comprising:
receiving a request for the data to be stored in the storage container; and
storing the data in the storage container in response to the altering of the existing access policy.

9. The computer-implemented method of claim 4, further comprising receiving a request for the data to be stored in the storage container, wherein the performing of the action comprises performing actions that include storing the data in the storage container, and sending the alert to the customer.

10. The computer-implemented method of claim 4, further comprising receiving a request for the data to be stored in the storage container, wherein the performing of the action comprises performing actions that include refraining from storing the data in the storage container, and sending the alert to the customer, the alert informing the customer that the data will not be stored in the storage container until the corresponding access policy is applied to the storage container.

11. The computer-implemented method of claim 4, wherein the existing access policy and the corresponding access policy each specify a plurality of roles and a plurality of permissions pertaining to storage container access.

12. The computer-implemented method of claim 4, further comprising determining that the type of data corresponds to a sensitivity level among the different sensitivity levels that meets or exceeds a threshold sensitivity level, wherein the identifying the corresponding access policy is based at least in part on the determining that the type of data corresponds to the sensitivity level that meets or exceeds the threshold sensitivity level.

13. The computer-implemented method of claim 4, wherein the determining that the existing access policy is less secure than the corresponding access policy comprises:
transforming the existing access policy and the corresponding access policy into the formula;
processing the formula with a satisfiability modulo theories (SMT) solver to determine a solution to the formula; and
generating a result as output of the SMT solver based at least in part on the processing, wherein the result indicates that the existing access policy is less secure than the corresponding access policy.

14. One or more non-transitory computer-readable media storing computer-executable instructions that, when executed by one or more processors of a network-based storage system, cause the network-based storage system to:
train a machine learning model using training data to generate a trained machine learning model, the training data including samples of customer data maintained by the network-based storage system that have been labeled with different types of data corresponding to different sensitivity levels of the samples of the customer data;
receive data that is, or is requested to be, stored in a storage container maintained by the network-based storage system;
classify the data as a type of data among the different types of data using the trained machine learning model;
identify a corresponding access policy that corresponds to the type of data;
determine, using a module configured to solve a formula expressed in a background theory, that an existing access policy associated with the storage container is less secure than the corresponding access policy, wherein the existing access policy specifies one or more first sources that are allowed or denied access to the storage container, and wherein the corresponding access policy defines one or more second sources different from the one or more first sources that are allowed or denied access to the storage container; and
perform an action based at least in part on the determining that the existing access policy is less secure than the corresponding access policy, wherein the action comprises at least one of:
altering the existing access policy for the storage container to the corresponding access policy;

sending an alert to a customer who is authorized to change the existing access policy of the storage container, the alert indicating that the existing access policy is insufficient for protecting the data; or storing the data in a different storage container associated with a different access policy that is as secure as, or more secure than, the corresponding access policy.

15. The one or more non-transitory computer-readable media of claim 14, wherein the computer-executable instructions, when executed by the one or more processors of the network-based storage system, further cause the network-based storage system to receive a request for the data to be stored in the storage container, and wherein receiving the data comprises receiving a data object containing the data from a computing device of the customer as part of the request for the data to be stored in the storage container, the storage container being associated with the customer.

16. The one or more non-transitory computer-readable media of claim 14, wherein the action comprises the altering of the existing access policy.

17. The one or more non-transitory computer-readable media of claim 16, wherein the computer-executable instructions, when executed by the one or more processors of the network-based storage system, further cause the network-based storage system to:

receive a request for the data to be stored in the storage container; and store the data in the storage container in response to the altering of the existing access policy.

18. The one or more non-transitory computer-readable media of claim 14, wherein the existing access policy and the corresponding access policy each specify a plurality of roles and a plurality of permissions pertaining to storage container access.

19. The one or more non-transitory computer-readable media of claim 14, wherein determining that the existing access policy associated with the storage container is less secure than the corresponding access policy comprises:

transforming, using a satisfiability modulo theories (SMT) solver, the existing access policy and the corresponding access policy into the formula;

processing the formula with the SMT solver in an attempt to find a solution to the formula; and generating a result as output of the SMT solver based at least in part on the processing, wherein the result indicates that the existing access policy associated with the storage container is less secure than the corresponding access policy.

20. The one or more non-transitory computer-readable media of claim 14, wherein the computer-executable instructions, when executed by the one or more processors of the network-based storage system, further cause the network-based storage system to:

determine that the type of data corresponds to a sensitivity level among the different sensitivity levels that meets or exceeds a threshold sensitivity level, wherein the identifying the corresponding access policy is based at least in part on the determining that the type of data corresponds to the sensitivity level that meets or exceeds the threshold sensitivity level.

\* \* \* \* \*